Feb. 9, 1960   F. W. MARTIN   2,924,306
BRAKE PROPORTIONING VALVE
Filed Dec. 28, 1956   2 Sheets-Sheet 2

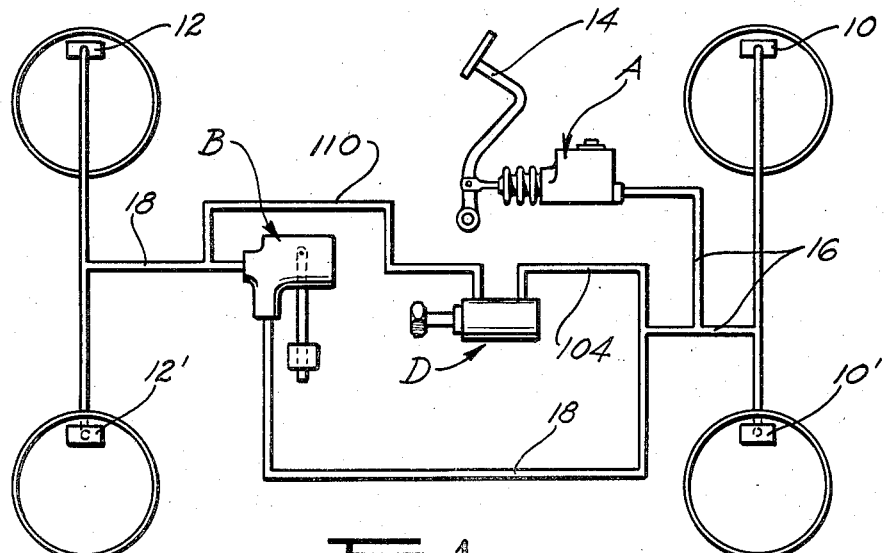
Fig. 1.
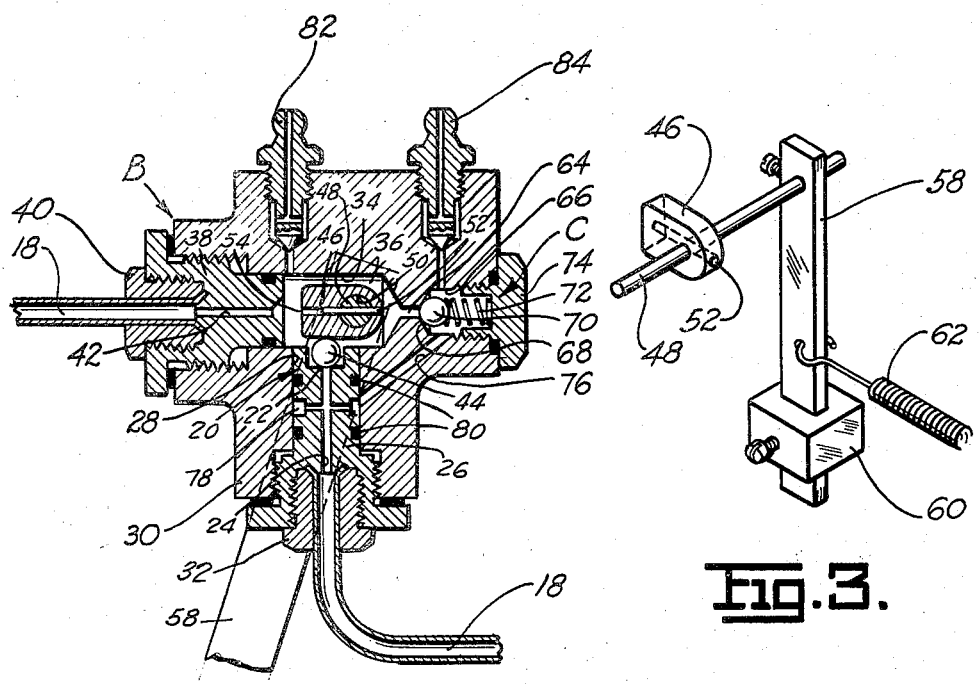
Fig. 2.
Fig. 3.
INVENTOR.
FREDERICK W. MARTIN.
BY
*William P. Hickey*
ATTORNEY.

INVENTOR.
FREDERICK W. MARTIN.
BY
William O. Hickey
ATTORNEY.

United States Patent Office 2,924,306
Patented Feb. 9, 1960

2,924,306

BRAKE PROPORTIONING VALVE

Frederick W. Martin, South Bend, Ind., assignor to Bendix Aviation Corporation, South Bend, Ind., a corporation of Delaware Application December 28, 1956, Serial No. 631,164

8 Claims. (Cl. 188—152)

The present invention relates to automotive braking systems; and more particularly to automotive hydraulic braking systems of a type which distributes the braking effort between the front and rear wheels of the vehicle in accordance with deceleration of the vehicle.

An object of the present invention is the provision of a new and improved automotive hydraulic braking system which distributes the vehicle braking effort between its front and rear wheels in a manner varying with the instantaneous deceleration of the vehicle so as to produce equal sliding tendencies for its front and rear wheels under substantially all road conditions and rates of deceleration.

Another object of the present invention is the provision of a new and improved braking system of the above described type which is simple in design, efficient and foolproof in its operation, and yet economical to manufacture.

Further objects of the present invention will become apparent to those skilled in the art to which the invention relates from the following description of the preferred embodiment described with reference to the accompanying drawings forming a part of the specification, and in which:

Figure 1 is a schematic view of an automotive hydraulic braking system embodying principles of the present invention;

Figure 2 is a cross-sectional view of a brake proportioning valve shown in Figure 1;

Figure 3 is a perspective view of the inertia elements utilized in the brake proportioning valve;

Figure 4:
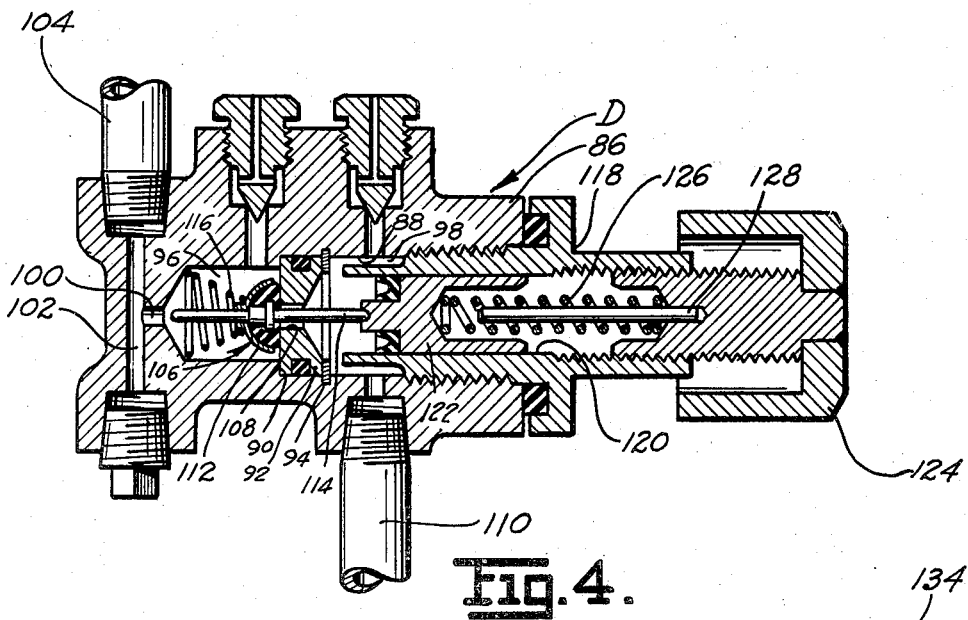
Figure 4 is a cross-sectional view of a limiting valve shown in Figure 1.

Deceleration of automotive vehicles when moving in a forward direction produces a force about the center of gravity of the vehicle in a forward direction which force tends to lift the rear wheels from the pavement while also tending to force the front wheels into more firm engagement with the pavement. Should equal braking effort therefore be applied to both the rear and front wheels of the vehicle, sliding of the rear wheels would normally be produced prior to the time at which the front wheels would start to slide. By reason of the fact that the coefficient of dynamic friction is less than the coefficient of static friction, a decrease in the vehicle retarding forces will develop immediately after the rear wheels start to slide. Sliding of the rear wheels prior to the sliding of the front wheels produces a further undesirable effect in that a slight sway of the vehicle will tend to cause the vehicle to turn around.

The improved braking system in Figure 1 generally comprises a pair of front wheel brake applying fluid pressure motors 10 and 10' and a pair of back wheel brake applying fluid pressure motors 12 and 12' which are controlled or regulated by means of a master cylinder A and the foot pedal lever 14. The front and rear wheel brakes of the system shown in Figure 1 will generally be constructed and arranged so as to develop equal braking effort in both the front and rear wheels when equal fluid pressure is applied to the front and rear wheel cylinders 10, 10' and 12, 12', respectively. Fluid pressure developed in the master cylinder A flows through a conduit 16 directly to the front wheel cylinders 10 and 10'; and a second branch conduit 18 communicates the master cylinder A with the rear wheel cylinders 12 and 12'. In order to effect proper distribution of the braking effort between the front and rear wheels of the vehicle, the brake proportioning valve B is inserted in the branch conduit 18.

The brake proportioning valve B generally comprises a back pressure valve 20 which reduces the hydraulic pressure supplied to the rear wheel brake applying fluid pressure motors 12 and 12'. The seat 22 of the back pressure valve 20 is formed by means of a longitudinal drilling 24 in a cylindrical plug 26 positioned in a vertical boring 28 in the valve body member 30. The cylindrical plug 26 is screwed into the bottom end of the vertical boring 28; and the branch conduit 18 is connected into the bottom end of the cylindrical plub 26 by means of a tube fitting 32 to communicate fluid pressure from the master cylinder A to the longitudinal drilling 24. A horizontal boring 34 in the body member 30 intersects the top end of the vertical boring 28 to provide an internal valve chamber 36. A cylindrical plug 38 is threaded into the end of the horizontal boring 34 to close off the internal valve chamber 36; and a continuation of branch conduit 18 is fastened to the end of the cylindrical plug 38 by means of a tube fitting 40. Communication between the continuation of the branch conduit 18 and the internal valve chamber 36 is provided by means of a longitudinal boring 42 in the cylindrical plug 38; and the continuation of the line 18 of course communicates with the rear wheel cylinders 12 and 12' of the vehicle. Throttling across the valve seat 22 is accomplished by means of a ball valve 44 biased against the seat 22 by means of a lever 46. Lever 46 is carried by a transverse shaft 48 which extends through a suitable opening 50 in the lever 46, and which is locked in place by means of a pin 52 that is pressed in a drilling 54 extending through the lever and shaft. The transverse shaft 48 is suitably journalled in a transverse drilling (not shown) in the body member positioned forwardly of the ball valve 44 and intersecting the boring 42. The shaft projects externally at one side of the housing and is provided with a generally downwardly extending lever 58 which carries a weight 60 adjustably positioned on its lower end. The lever 58 will normally be positioned downwardly and rearwardly of a true vertical position so as to provide a predetermined amount of force holding the ball valve 44 into engagement with its valve seat 22 at all times. Alternatively the ball valve 44 may be held into engagement with its seat 22 by means of a spring 62; and in some instances both expedients may be used to hold the ball valve against the seat. During periods of deceleration of the vehicle the weight 60 produces a moment or torque upon the shaft 48 which in turn is applied to the lever 46 to urge the ball 44 more firmly against the seat 22. Pressure developed by the master cylinder A will therefore be throttled across the ball valve 44 such that the pressure delivered to the rear wheel cylinders 12 and 12' will be only a fraction of that delivered to the front wheel cylinders 10 and 10'.

Inasmuch as the structure above described normally holds the ball valve 44 into engagement with its seat 22, return flow from the rear cylinders 12 and 12' is communicated around the back pressure valve by means of check valve structure C. The check valve structure C is formed by means of a small diameter drilling 64 which communicates the internal valve chamber 36 with the front end of the body member 30 and the forward end of which is counterbored as at 66 to provide a valve seat 68. A ball valve 70 is biased into engagement with the valve seat 68 by means of a coil spring 72 interpositioned between the ball and a plug 74 adapted to seal off the end of the counterbore 66. Communication between the counterbore 66 and the section of the branch conduit 18 leading to the master cylinder A is provided by means of a diagonal drilling 76 in the body member 30 which intersects the vertical boring 28. Suitable transverse drilling in the cylindrical plug 26 communicates the diagonal drilling 76 with its internal passageway or drilling 24, and suitable seals 80 are used to prevent leakage between the plug and body member. A pair of bleed connections 82 and 84 are also provided to permit air to be bled from the internal valve chamber 36 and the counterbore 66 respectively.

Operation of the system so far described is initiated by depressing of the foot pedal lever 14 which causes pressure to be developed within the master cylinder A. The pressure so generated is communicated directly to the front wheel cylinders 10 and 10' and at the same time is caused to flow to the inlet of the brake proportioning valve B through the branch conduit 18. Pressure from the conduit 18 passes through the longitudinal drilling 24 to the underside of the ball valve 44 and at the same time is communicated through to forward end of the check valve structure C by means of the diagonal drilling 76. Inasmuch as ball valve 44 has been previously described as being held into engagement with its valve seat 22, either by a coil spring 62 or a suitable inclination of the lever 58, a throttling effect will be produced across the ball valve 44 to decrease the pressure which is communicated to the rear wheel cylinders 12 and 12'. Thereafter deceleration of the vehicle causes a forward force to be applied to the weight 60; and in turn a torque to be applied to the shaft 48 through lever 58 causing the ball valve 44 to be forced into more firm engagement with its valve seat 22. This of course produces a further throttling effect across the back pressure valve 20 which effect will be generally in proportion to the rate at which the vehicle is being decelerated. When the vehicle has been slowed down sufficiently and the operator retracts the brake pedal lever 14, pressure in the front wheel cylinders will be gradually reduced without a corresponding diminishment of pressure in the rear wheel cylinders 12 and 12'. When the pressure in the front wheel cylinders has decreased to a point where it is slightly below that in the rear wheel cylinders by an amount which is determined by spring 72, further retraction of the brake pedal lever 14 thereafter permits the check valve structure C to open. Fluid then returns from the rear wheel cylinders 12 and 12', such that thereafter the front and rear cylinders 10, 10' and 12, 12' are bled down together. Applicant has found that the initial biasing action produced by the spring 62 and/or the previously described inclined position of the lever 58 is desirable to prevent a fast application of the brakes from setting the rear wheel brakes before lever 58 has had time to produce the necessary throttling effect in the fluid proceeding to the rear wheel cylinders.

As a further refinement to the system above described, a disabling valve D may sometimes be provided to provide direct communication between the master cylinder A and the rear wheel cylinders for master cylinders pressures below a predetermined value. This has been found desirable in some instances to speed up the application of the rear wheel cylinder 12 and 12'; inasmuch as the back pressure valve 20 will normally be held in its closed position by a predetermined amount of force. The disabling valve D as seen in Figure 4 generally comprises a body member 86 provided with a stepped bore 88 which provides a shoulder 90 against which an annular valve seat member 92 is held by means of a snap ring 94. The valve seat member 92 in effect separates the bore 88 into a pair of valve chambers 96 and 98—the first of which is connected to the master cylinder A through the drillings 100 and 102, and the branch conduit 104 connecting with the conduit 16. A check valve structure 106 is positioned in the valve chamber 96 for preventing flow from the conduit 104 through the central opening 108 of the annular member 92 to the rear valve chamber 98, and thence through branch conduit 110 to the conduit 18 leading to the rear wheel cylinders 12 and 12'. The check valve 106 comprises a nonmetallic closure member 112 formed onto a longitudinally extending pin 114 which projects through the opening 108 into the valve chamber 98, and a coil spring 116 positioned between the closure member 112 and the bottom of the valve chamber 96 to urge the closure member against its valve seat 92.

The opposite end of the valve chamber 98 which communicates with the rear wheel cylinders is closed off by means of a bushing 118 threaded into the end of the stepped bore 88. The bushing 118 is provided with a longitudinally extending bore 120 therethrough. The inner end of the bore 120 is provided with a piston 122, and the outer end of the bore is provided with a threaded adjustment nut 124. A coil spring 126 is compressed between the piston 122 and the adjustment nut 124 to urge the piston 122 inwardly against the end of the longitudinally extending pin 114 of the check valve structure 106. Force exerted by the coil spring 126 will therefore normally hold the closure member 112 out of engagement with the valve seat 92 permitting free flow between the conduits 104 and 112. After sufficient hydraulic pressure has been developed by the master cylinder A piston 122 will be biased rearwardly to compress coil spring 126 thereby permitting the check valve closure member 112 to abut the valve seat 92. Thereafter further flow from the master cylinder A to the rear wheel cylinders 12 and 12' will be required to pass through the brake proportioning valve B. A pin 128 is provided between the adjustment nut 124 and the piston 122 to provide means for holding the valve 112 off its seat 92 if so desired.

Figure 5:
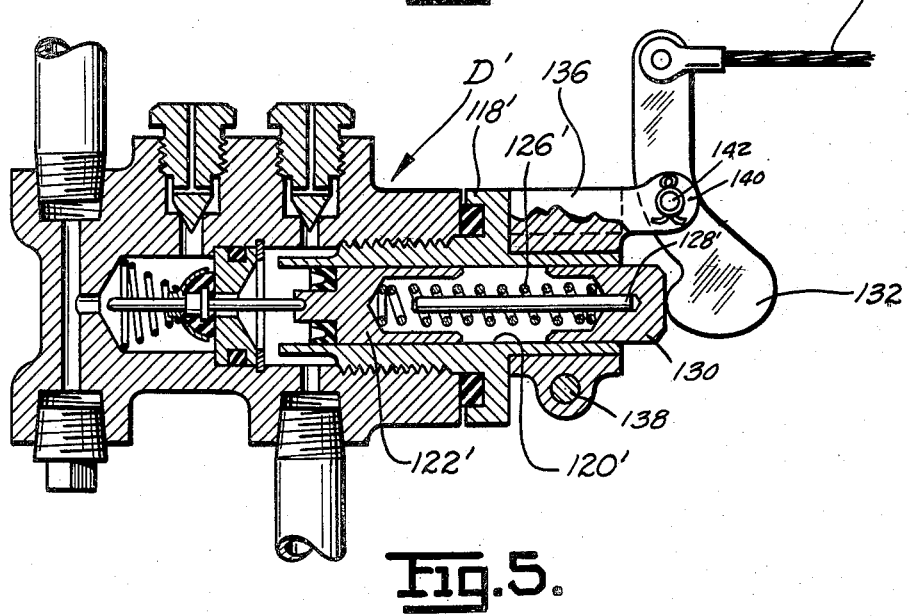
Figure 5 is a cross-sectional view of a limiting valve similar to that shown in Figure 4 but incorporating means for adjusting the valve remotely.

A slightly modified disabling valve designated D' is seen in Figure 5 and all parts of the valve D' which correspond to those of the valve D are designated by a like reference numeral characterized further in that a prime mark is affixed thereto. The valves D and D' are similar in all respects excepting in the manner in which adjustment of the tension in spring 126 is accomplished. In the embodiment D', the bushing 118' is provided with an unthreaded bore 120'—in the outer end of which is positioned a cylindrical plug 130. The coil spring 126' is interpositioned between the piston 122' and the plug 130; and the plug 130 is adjustably held in position by means of a lever 132 one end of which bears against the outer end of the plug 130 and the other end of which is provided with a cable 134 which can be remotely tensioned by the operator. A support member 136 for the lever is clamped over the outside of the outwardly projecting portion of the bushing 118' as by a machine screw 138, and the lever 132 is pivotally connected to the support member 136 between the ends of the lever by means of a bifurcated projection 140 and pin 142.

While the invention has been described in considerable detail, I do not wish to be limited to the particular constructions shown and described; and it is my intention to cover hereby all adaptations, modifications and arrangements thereof which come within the practice of those skilled in the art to which the invention relates.

I claim:—

1. In an automotive braking system and the like: front and rear brake applying fluid pressure motors, control means for controlling fluid pressure flows to said fluid pressure motors, conduit means providing fluid communication between said control means and said front brake applying fluid pressure motor, means providing fluid communication between said control means and said rear brake applying motor and including a valve having an inlet port communicating with said control means and an outlet port communicating with said rear wheel brake applying fluid pressure motor, a movable valve closure member in said valve which closure member increases its throttling effect upon flow from said inlet port to said outlet port as said closure member is biased in a first direction, said valve closure member being biased in the opposite direction by pressure from said control means, and said valve closure member being biased in said first direction by an inertia force which increases as the rate of vehicle deceleration increases.

2. In an automotive braking system and the like: front and rear brake applying fluid pressure motors, control means for controlling fluid pressure flows to said fluid pressure motors, conduit means providing fluid communication between said control means and said front brake applying fluid pressure motor, means providing fluid communication between said control means and said rear brake applying motor and including a back pressure valve having an inlet port communicating with said control means and an outlet port communicating with said rear wheel brake applying fluid pressure motor, a valve closure member in said valve for increasing its throttling effect upon flow from said inlet port to said outlet port as said closure member is biased in a first direction, said valve closure member being biased in the opposite direction by pressure from said control means, said valve closure member being biased in said first direction by an inertia force which increases as the rate of vehicle deceleration increases, said valve closure member being normally biased in said first direction closing communication between said inlet and outlet ports when no inertia forces are acting upon said valve closure member, and a check valve constructed and arranged to by-pass said back pressure valve, said check valve being constructed to close upon flow from said control means to said rear motor and to open for return flow from said rear motor to said control means.

3. In an automotive braking system and the like: front and rear brake applying fluid pressure motors, control means for controlling fluid pressure flows to said fluid pressure motors, conduit means providing fluid communication between said control means and said front brake applying fluid pressure motor, means providing fluid communication between said control means and said rear brake applying motor and including a back pressure valve having an inlet port communicating with said control means and an outlet port communicating with said rear wheel brake applying fluid pressure motor, a valve closure member in said valve for increasing its throttling effect upon flow from said inlet port to said outlet port as said closure member is biased in a first direction, said valve closure member being biased in the opposite direction by pressure from said control means, said valve closure member being biased in said first direction by an inertia force which increases as the rate of vehicle deceleration increases, said valve closure member being normally biased into its position closing communication between said inlet and outlet ports when no inertia forces are acting upon said valve closure member, a check valve constructed and arranged to by-pass said back pressure valve, said check valve being constructed to close upon flow from said control means to said rear motor and to open for return flow from said rear motor to said control means, and means for causing substantially unthrottled flow to be communicated from said inlet port to said outlet port at discharge pressures of said control means below a predetermined value.

4. In an automotive braking system and the like: front and rear brake applying fluid pressure motors, control means for controlling fluid pressure flows to said fluid pressure motors, first conduit means providing fluid communication between said control means and said front brake applying fluid pressure motor, second conduit means providing fluid communication between said control means and said rear brake applying fluid pressure motor, a back pressure valve in said second conduit means adapted to restrict flow to said rear motor, said back pressure valve having a counterbored inlet port the small diameter portion of which communicates with said control means, the large diameter portion of which communicates with said rear brake applying fluid pressure motor, and the shoulder of which counterbore forms a valve seat, a valve closure member in the large diameter portion for abutment with said valve seat, a shaft positioned generally transversely to the normal direction of motion of the vehicle, a lever attached to said shaft for applying torque to said shaft during deceleration of the vehicle, and means operatively connecting said shaft and said valve closure member for causing torque produced during deceleration of the vehicle to urge said valve closure member against said valve seat.

5. In an automotive braking system and the like: front and rear brake applying fluid pressure motors, control means for controlling fluid pressure flows to said fluid pressure motors, first conduit means providing fluid communication between said control means and said front brake applying fluid pressure motor, second conduit means providing fluid communication between said control means and said rear brake applying fluid pressure motor, a back pressure valve in said second conduit means adapted to restrict flow to said rear motor, said back pressure valve having an inlet port supplied with pressure fluid from said control means and a valve seat surrounding said inlet port, a valve closure member for sealing abutment with said valve seat, said valve closure member being normally held adjacent said valve seat, a shaft positioned generally transversely to the normal direction of motion of the vehicle, a lever attached to said shaft for applying torque to said shaft during deceleration of the vehicle, means operatively connecting said shaft and said valve closure member for causing torque produced during deceleration of the vehicle to urge said valve closure member against said valve seat, said valve closure member being biased into engagement with said valve seat when no inertia forces are acting upon said valve closure member and a check valve in a passageway by-passing said back pressure valve and constructed and arranged for preventing flow through said passageway from said control means to said rear motor but permitting return flow from said rear motor to said control means.

6. In an automotive hydraulic braking system and the like: front and rear brake applying fluid pressure motors, control means for controlling hydraulic pressure flows to said fluid pressure motors, first conduit means providing fluid communication between said control means and said front brake applying fluid pressure motor, second conduit means providing fluid communication between said control means and said rear brake applying fluid pressure motor, a back pressure valve in said second conduit means adapted to restrict flow to said rear motor, said back pressure valve having an inlet port supplied with pressure fluid from said control means and a valve seat surrounding said inlet port, a valve closure member for sealing abutment with said valve seat, said valve closure member being normally biased against said valve seat, a shaft in said valve positioned generally transversely to the normal direction of motion of the vehicle, a lever attached to said shaft for applying torque to said shaft during deceleration of the vehicle, means operatively connecting said shaft and said valve closure member for causing torque produced during deceleration of the vehicle to urge said valve closure member against said valve seat, a check valve in a passageway by-passing said back pressure valve and constructed and arranged for preventing flow through said passageway from said control means to said rear motor but permitting return flow from said rear motor to said control means, and means holding said check valve open at output pressures of said control means below a predetermined value.

7. In an automotive braking system and the like: front and rear brake applying fluid pressure motors, control means for controlling fluid pressure flows to said fluid pressure motors; first conduit means providing fluid communication between said control means and said front brake applying fluid pressure motor, second conduit means providing fluid communication between said control means and said rear brake applying fluid pressure motor, an inertia responsive back pressure valve in said second conduit means for closing off said second conduit, a check valve in a passageway by-passing said back pressure valve and constructed and arranged for preventing flow through said passageway from said control means to said rear motor but permitting return flow from said rear motor to said control means, spring means holding said check valve open, and means subject to the fluid pressure in said system and constructed and arranged to overcome said spring and permit said check valve to close at pressures above a predetermined value.

8. In an automotive hydraulic braking system and the like: front and rear brake applying fluid pressure motors, first conduit means providing fluid communication between said control means and said front brake applying fluid pressure motor, second conduit means providing fluid communication between said control means and said rear brake applying fluid pressure motor, an inertia responsive back pressure valve in said second conduit means for closing off said second conduit, a check valve in a passageway by-passing said back pressure valve and constructed and arranged for preventing flow through said passageway from said control means to said rear motor, and means holding said check valve open at output pressures of said control means below a predetermined value.

References Cited in the file of this patent

UNITED STATES PATENTS

| | | |
|---|---|---|
| 2,088,184 | White | July 27, 1937 |
| 2,218,194 | Freeman | Oct. 15, 1940 |
| 2,283,713 | Wolf | May 19, 1942 |

FOREIGN PATENTS

| | | |
|---|---|---|
| 471,716 | Great Britain | Sept. 9, 1937 |